(12) United States Patent
Emmett

(10) Patent No.: US 6,407,769 B1
(45) Date of Patent: Jun. 18, 2002

(54) MEASUREMENT OF TIMING DELAY BETWEEN ASSOCIATED SIGNALS OR BITSTREAMS

(76) Inventor: John Robert Emmett, 36 Acacia Rd., Hampton, Middlesex TW12 3DS (GB)

( * ) Notice: Subject to any disclaimer, the term of this patent is extended or adjusted under 35 U.S.C. 154(b) by 0 days.

(21) Appl. No.: 09/249,941

(22) Filed: Feb. 12, 1999

(51) Int. Cl.$^7$ .............................. H04N 17/00; H04N 7/08
(52) U.S. Cl. ......................... 348/180; 348/192; 348/484
(58) Field of Search ................................. 348/180, 192, 348/512, 518, 738, 484; H04N 17/00, 9/475, 7/08

(56) References Cited

U.S. PATENT DOCUMENTS 5,243,424 A * 9/1993 Emmett ....................... 348/484

* cited by examiner

Primary Examiner—Sherrie Hsia
(74) Attorney, Agent, or Firm—Stroock & Stroock & Lavan LLP

(57) ABSTRACT

A system for measurement of a differential delay between a primary signal and a secondary signal or signals, propagating between a nominal source and a nominal destination. The source has a first detection unit for the detecting of a rapid change in a given parameter of the primary signal, and an applying unit for applying a timing signal containing timing information relating to the rapid change in the parameter of the primary signal detected by the first detection unit to the secondary signal(s). The destination has a second detection unit for the detection of a rapid change in the given parameter of the primary signal, a recovery unit for recovering the timing signal from the secondary signal(s) and a third detection unit for the detection of the timing information relating to the rapid changes in the parameter of the primary signal from the recovered timing signal.

15 Claims, 2 Drawing Sheets

MEASUREMENT OF TIMING DELAY BETWEEN ASSOCIATED SIGNALS OR BITSTREAMS

BACKGROUND OF THE INVENTION

This invention relates to a method for the measurement of the absolute differential delay between two or more associated signal streams (or digital bitstreams). One of the signals (or bitstreams), known as the primary signal, could represent picture or video content. The other or others would normally carry information related to, and time critical with, the primary channel. Examples of these secondary signals would be the audio or other picture related data, where the primary channel carried video information. The primary channel remains unaffected by the application of this invention whereas one or more secondary channels have a non-invasive timing reference signal added. This timing reference signal may be removed if desired.

It is well known for different signals (or bitstreams) to suffer from different delays, even when they are carried in the form of a combined channel or digital bitstream, or digital packet. This situation can arise, for instance, because of the different delays that are incurred by the different processing and coding procedures that are appropriate for the different types of signal content carried in the primary and secondary channels.

In particular cases where the primary signal carries video information, and the secondary channels carry audio associated with the video content, it is well known that there exists a restricted range over which the differential time delays are perceptually acceptable to human viewers. It is also known that correction of these delays by operator perception alone cannot be relied on to achieve the desirable close limits, especially where the delays concerned vary over a period of time.

A suitable timing measurement is described in UK Patent GB 2244184, where a system for the measurement of delay between a video signal and a single audio signal is described. This includes a tone burst generator that can be used to mark the audio signal at a single known period after a picture cut occurs in the video signal. The method has the advantage that the primary signal requires no intervention. However, the isolated marker signal inserted into the audio may be prone to interference from or confusion with the coexisting signal content, or by corruption which may take place in the coding, processing or decoding processes between the source and the destination signals. The result is that reliability of the marker detection may be poor under some circumstances, and the accuracy of the measurement will be limited by the single occurrence of the marker.

Other methods, such as that described in GB 2181325A, involve addition of a crude representation of the correctly timed secondary signal on to the primary signal. In this particular case, the addition is made to the vertical interval of an analogue video primary signal. Information placed in the vertical interval period is especially prone to removal or corruption during processing or standards conversion of the video signal.

SUMMARY OF THE INVENTION

According to the invention, there is provided a system for the measurement of the differential delay between a primary signal and a secondary signal or signals, propagating between a nominal source and a nominal destination, the system comprising, at said source:

first detection means detecting of a rapid change in a given parameter of said primary signal, and applying means for applying a timing signal containing timing information relating to the rapid change in said parameter of said primary signal detected by said detection means to the secondary signal(s)

and at said destination:

second detection means for the detection of a rapid change in the said given parameter of the primary signal, recovery means for recovering said timing signal from said secondary signal(s) and third detection means for detection of the timing information relating to said rapid changes in the said parameter of said primary signal from the recovered timing signal.

Thus, in a preferred embodiment of the invention, a continuous or semi continuous time reference signal is utilised, which may be concealed by carriage in the form of a differentially modulated signal between two or more closely related secondary signals, for example, between two or more channels of stereo audio. The time reference signal which is carried may refer to an absolute reference time or it may carry a reference to the time datum at which a given measurable disturbance in a parameter of the primary signal occurs. When another measurable disturbance occurs in the primary signal, and allowing for a suitable delay for the first measurement to be completed, this time datum may be reset. The disturbance used as the time datum may be related to a portion or the whole of the primary signal content, or it may relate to a suitable system characteristic such as a data packet boundary. In either case, the associated secondary marker signal only requires a short period of correct reception in order for the time reference to be obtained. This period is free to occur singly or multiply at any time during the transmission period of the reference signal. Confirmation of correct reception may be obtained with the value obtained from later time reference reception periods.

Additionally, the time datum measurements may be applied, if necessary via an algorithm that confirms the validity of the values received, to variable delay apparatus in either primary or secondary signal paths. This will enable a correct timing relationship to be established. The timing changes necessary may be applied via a second algorithm which changes the necessary delay periods over a period of time in such a way that the signal content carried on the primary or secondary channels is not adversely affected by the delay changes.

BRIEF DESCRIPTION OF THE DRAWINGS

The invention will now be described in greater detail, by way of example, with reference to the drawings, in which:-

DESCRIPTION OF THE PREFERRED EMBODIMENT

Figure 1:
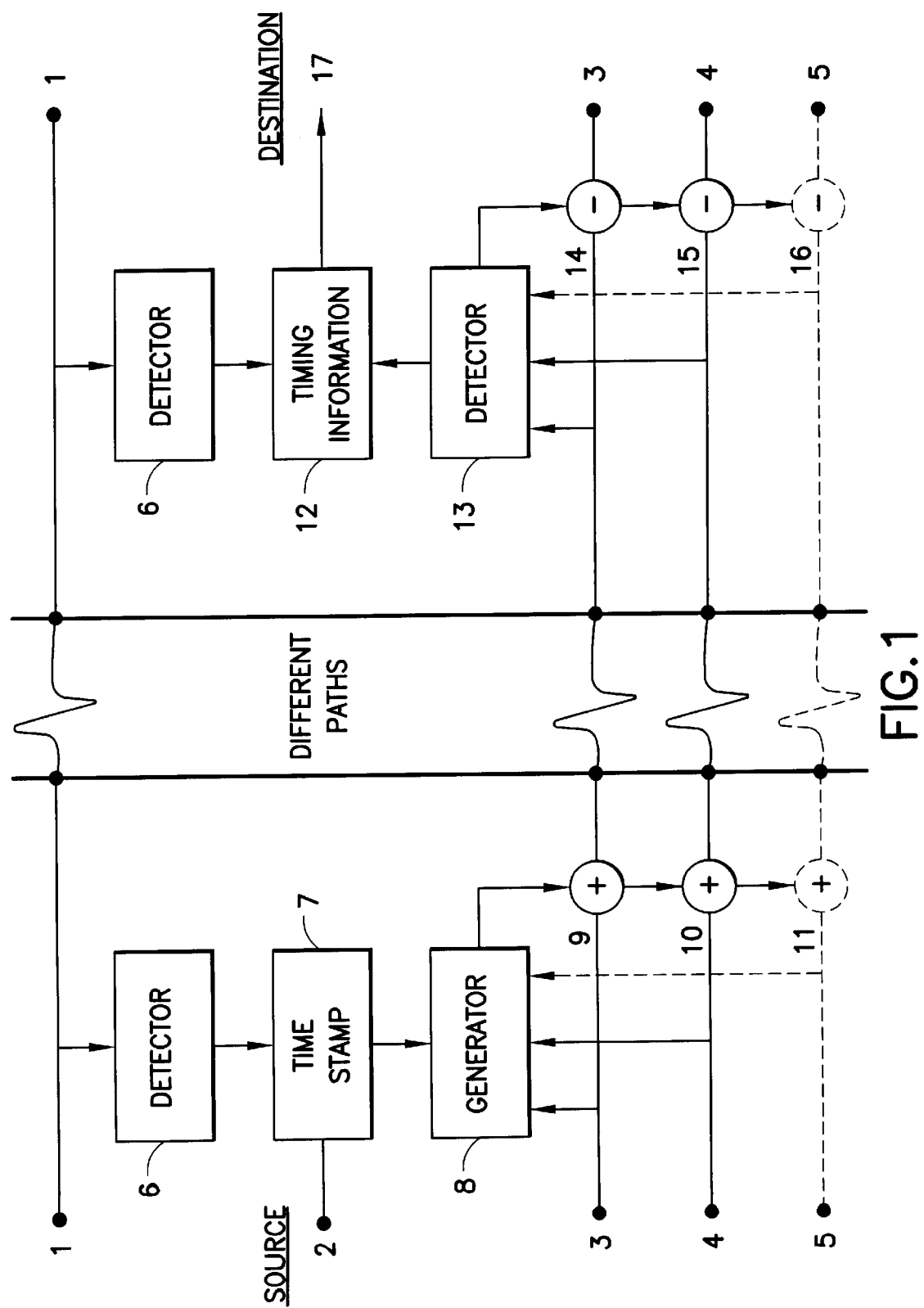
FIG. 1 is a block diagram of a system in accordance with the present invention.

Referring firstly to FIG. 1, at the source, a detector 6 recognizes a given rapid change in a parameter of the primary signal 1. This may refer only to a portion of the primary signal content, for example, a selected portion of the primary signal content, for example, a selected portion of a video picture either within or outside the displayed area. The time datum for this change, and/or the time from an external source 2, supplies the data for a time stamp 7 which is applied to marker or timing signals generated by a marker or timing signal generator 8, and added via 9, 10, 11, etc. to the secondary signals 3, 4, 5, etc. The secondary signal inputs into the marker generator to allow the generator 8 to modify or inhibit the marker signals in such a manner that they do not significantly affect the signal content carried in the secondary signals. For example, in the case of audio signals, this modification may take the form of adjusting the inserted marker signal amplitude or frequency range according to the instantaneous masking potential of the audio signal content. Similarly, the phase relationships of the marker signal may be adjusted in order to render the -marker signal as non-intrusive as possible to the signal information carried in a particular secondary channel or channels.

It will be appreciated by those skilled in the art that the different paths followed by the primary and secondary signals may represent differing processing or recording delays suffered by the primary and secondary signals within a single item of equipment. Any time difference introduced between the signals will serve the same purpose.

At the destination, the marker signal is recovered by means of a detector 13 from each secondary signal separately, or in conjunction between two or more secondary signals. The marker signals may then be optionally removed from the secondary signals, if required. This removal process may be performed by subtraction in 14, 15, 16, etc.

The timing information may then be recovered from the detected marker signal and compared with the timing of the same rapid primary signal parameter change as was employed in the coding section. A detector 6' therefore operates here in a similar manner to the detection process performed at the source by the detector 6. The timing information 12 is made available at the output 17, after which it may be subject to a logical validity check before being recorded or displayed for the benefit of an operator, or used for the purposes of delay correction.

Figure 2:
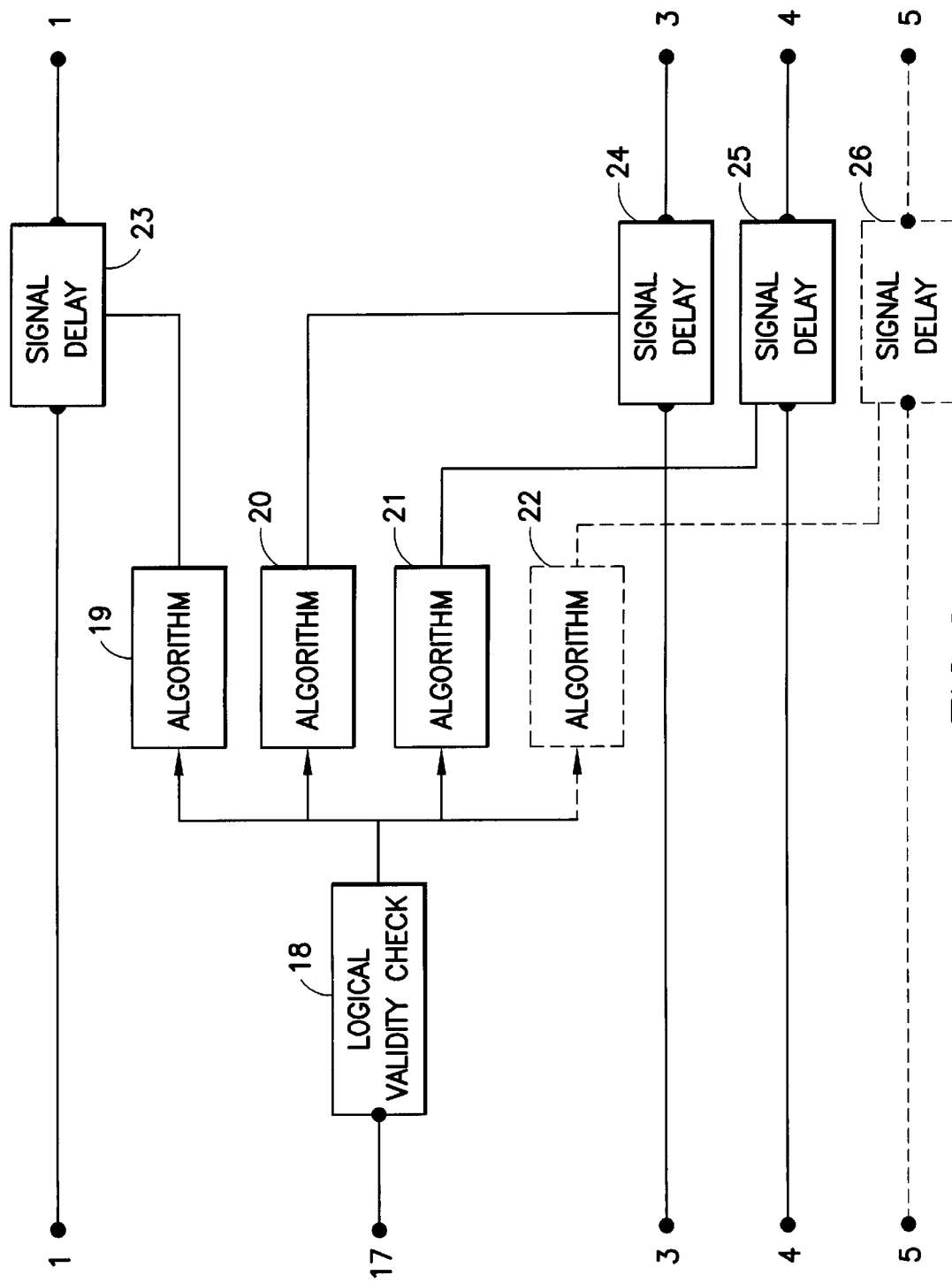
FIG. 2 is a block diagram of one possible form of arrangement for correction of the timing delay using the present invention.

FIG. 2 illustrates one possible arrangement for the correction of the timing delays between the signals involved. The timing information 12 is subjected to a logical validity check in 18 before being applied to the signal delays 23, 24, 25, 26, etc., one of these delays lying in each signal path. The timing information 12 may be applied to the delays via perceptually based algorithms 19, 20, 21, 22, etc. The algorithms vary the relative delays 23, 24, 25, 26, etc. in a manner intended to be non-intrusive to the signal content according to the type of signal content carried on the primary and secondary signals 1, 3, 4, etc.

As an example of these procedures, only integral numbers of frames of video information might be used to delay signals based on video information. On the other hand, signals carrying audio or other similar information could be delayed over a continuous range by adding or subtracting periods of silence. Alternatively, slowly varying the delays in such a manner as to vary the pitch of the signals in an imperceptible manner would achieve the same end result.

What is claimed is:

1. A system for the measurement of the differential delay between a primary signal and a secondary signal or signals, propagating between a nominal source and a nominal destination, the system comprising, at said source:
   first detection means detecting of a rapid change in a given parameter of said primary signal, and
   applying means for applying a timing signal containing timing information relating to the rapid change in said parameter of said primary signal detected by said detection means to the secondary signal(s),
   and at said destination,
   second detection means for the detection of a rapid change in said given parameter of the primary signal,
   recovery means for recovering said timing signal from said secondary signal(s) and
   third detection means for detection of the timing information relating to said rapid changes in said parameter of said primary signal over a single period of correct reception of the timing signal from the recovered timing signal and confirming the accuracy of the timing information by later periods of correct reception of the timing signal.

2. A system according to claim 1, further comprising change means acting to alter the timing relationship between said primary signal and said secondary signal(s).

3. A system according to claim 1, wherein said applying means is adapted to apply said timing signal to said secondary signal(s) to leave said secondary signal(s) substantially unaffected by said timing signal.

4. A system according to claim 1, wherein said applying means distributes said timing signal between associated ones of said secondary signals.

5. A system according to claim 1, wherein said applying means applies said timing signal to a dedicated secondary signal.

6. A system according to claim 1, wherein the secondary signal(s) carry audio information and wherein said system further comprises, at said source, masking means for rendering the timing signals inaudible.

7. A system according to claim 6, wherein the applying means applies a differential timing signal.

8. A system as claimed in claim 1, and comprising means for obtaining a timing reference from a period of correct reception of a part of the timing signal only.

9. A system as claimed in claim 1, wherein said first and/or second detection means detects rapid changes of parameter of only a portion of said primary signal.

10. A system according to claim 9, wherein said portion of said primary signal is a selected portion of a video picture having a visible area.

11. A system according to claim 10, wherein said selected portion of said video picture lies within the visible area of the video picture.

12. A system according to claim 10, wherein said selected portion of said video picture lies outside the visible area of the video picture.

13. A system for the measurement of the differential delay between a primary signal and a secondary signal or signals, propagating between a nominal source and a nominal destination, the system comprising, at said source:
   first detection means detecting of a rapid change in a given parameter of said primary signal, and applying means for applying a timing signal containing timing information relating to the rapid change in said parameter of said primary signal detected by said detection means to said secondary signal(s) substantially unaffected by said timing signal, and at said destination, second detection means for the detection of a rapid change in said given parameter of the primary signal, recovery means for recovering said timing signal from said secondary signal(s) and third detection means for detection of the timing information relating to said rapid changes in said parameter of said primary signal over a single period of correct reception of the timing signal from the recovered timing signal and confirming the accuracy of the timing information by later periods of correct reception of the timing signal.

14. A system according to claim 13, wherein said applying means distributes said timing signal between associated ones of said secondary signals.

15. A system according to claim 13, wherein said applying means applies said timing signal to a dedicated secondary signal.

* * * * *